United States Patent
Lee et al.

(10) Patent No.: US 12,075,184 B2
(45) Date of Patent: Aug. 27, 2024

(54) DISPLAY DEVICE AND METHOD FOR CONTROLLING SAME

(71) Applicant: LG ELECTRONICS INC., Seoul (KR)

(72) Inventors: Manho Lee, Seoul (KR); Youngjoon So, Seoul (KR); Younghwan Kim, Seoul (KR); Yunsup Shin, Seoul (KR); Salkmann Ji, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 66 days.

(21) Appl. No.: 18/085,242

(22) Filed: Dec. 20, 2022

(65) Prior Publication Data
US 2024/0064267 A1 Feb. 22, 2024

(30) Foreign Application Priority Data
Aug. 16, 2022 (KR) .................. 10-2022-0102215

(51) Int. Cl.
*H04N 5/272* (2006.01)
*H04N 5/222* (2006.01)
*H04N 23/695* (2023.01)
*H04N 23/74* (2023.01)

(52) U.S. Cl.
CPC ........... *H04N 5/272* (2013.01); *H04N 5/2226* (2013.01); *H04N 23/695* (2023.01); *H04N 23/74* (2023.01)

(58) Field of Classification Search
CPC .. H04N 5/44504; H04N 5/445; H04N 5/2226; H04N 5/265; H04N 5/272; H04N 23/695; H04N 23/74; H04N 13/351; H04N 13/302; H04N 13/366; H04N 7/141; G09G 5/36; G09G 2360/04
USPC ....... 348/586, 584, 598, 553, 564, 568, 569, 348/383; 345/1.1, 1.3
See application file for complete search history.

(56) References Cited

U.S. PATENT DOCUMENTS

| | | | |
|---|---|---|---|
| 2013/0141551 A1* | 6/2013 | Kim | H04N 5/445 348/564 |
| 2015/0172585 A1* | 6/2015 | Park | H04N 5/63 348/569 |
| 2017/0124931 A1 | 5/2017 | Bell et al. | |
| 2019/0266970 A1 | 8/2019 | Newton | |
| 2021/0165623 A1 | 6/2021 | Shao et al. | |

FOREIGN PATENT DOCUMENTS

| | | |
|---|---|---|
| KR | 10-2016-0037701 | 4/2016 |
| KR | 10-2019-0098792 | 8/2019 |

OTHER PUBLICATIONS

PCT International Application No. PCT/KR2023/011898, International Search Report dated Nov. 13, 2023, 9 pages.

* cited by examiner

*Primary Examiner* — Sherrie Hsia
(74) *Attorney, Agent, or Firm* — LEE, HONG, DEGERMAN, KANG & WAIMEY (57) ABSTRACT

The present disclosure relates to a display device and a method for controlling the same. A display device according to one embodiment includes a first display, a second display disposed at a front side of the first display with a predetermined distance therebetween, and arranged in parallel to the first display, and a controller configured to control the first display and the second display to alternately output a specific graphic object to realize an output of a three-dimensional image.

20 Claims, 5 Drawing Sheets

DISPLAY DEVICE AND METHOD FOR CONTROLLING SAME

CROSS-REFERENCE TO RELATED APPLICATION

Pursuant to 35 U.S.C. § 119(a), this application claims the benefit of earlier filing date and right of priority to Korean Patent Application No. 10-2022-0102215, filed on Aug. 16, 2022, the contents of which are hereby incorporated by reference herein in its entirety.

TECHNICAL FIELD

The present disclosure relates to a display device and a method for controlling the same, and more particularly, to a display device for outputting a three-dimensional image using a plurality of displays, and a method for controlling the same.

BACKGROUND ART

A display device includes any of devices that receive and output broadcast signals, record and playback video signals, and record and playback audio signals. The display device includes, for example, a television, a smart TV, a computer monitor, an all-in-one PC (or integrated PC) that a monitor and a main body are combined, a laptop computer, a projector, a tablet, a mobile terminal, and the like.

As functions are diversified, display devices have been implemented as integrated multimedia players that have combined functions of capturing still images or moving images, playing games, receiving broadcast and the like in addition to playing back broadcast or music or video files. In recent years, display devices have also been implemented as smart devices (e.g., a smart television). Accordingly, display devices operate in conjunction with a mobile terminal, a computer or a server as well as an execution of the Internet.

On the other hand, recently, various technologies are being used to output three-dimensional images, and development of technologies for outputting three-dimensional images using various displays such as a hologram, a kiosk, and a signage is being carried out.

SUMMARY

One aspect of the present disclosure is to provide a display device capable of outputting a three-dimensional image using a plurality of displays, and a method for controlling the same.

To achieve the aspect and other advantages of the present disclosure, there is provided a display device that may include a first display, a second display disposed at a front side of the first display with a predetermined distance therebetween, and arranged in parallel to the first display, and a controller configured to control the first display and the second display to alternately output a specific graphic object to realize an output of a three-dimensional image.

In an embodiment disclosed herein, the controller may not output the specific graphic object to the second display when the specific graphic object is output to the first display, and may not output the specific graphic object to the first display when the specific graphic object is output to the second display.

In an embodiment disclosed herein, the controller may output the specific graphic object in the same size when the specific graphic object is output to the first display and when the specific graphic object is output to the second display.

In an embodiment disclosed herein, the controller may output the specific graphic object in a first size when the specific graphic object is output to the first display, and output the specific graphic object in a second size larger than the first size when the specific graphic object is output to the second display.

In an embodiment disclosed herein, the controller may output the specific graphic object at a corresponding position based on a direction perpendicularly penetrating through the first display and the second display.

In an embodiment disclosed herein, the first display and the second display may have the same output size.

In an embodiment disclosed herein, the display device may further include a case configured to surround edges of the first display and the second display.

In an embodiment disclosed herein, lightings may be disposed at corners of the case.

In an embodiment disclosed herein, the lightings may output light with darker brightness from the second display toward the first display.

In an embodiment disclosed herein, the second display may be a transparent display.

In an embodiment disclosed herein, the controller may set a region in the first display to have a smaller size than an output screen of the second display, and output the specific graphic object within the region.

In an embodiment disclosed herein, the controller may display a guide image provided to assist an identification of the region on the first display.

In an embodiment disclosed herein, the guide image may include a figure formed to identify the region, and a plurality of lines drawn toward vertices of the first display.

In an embodiment disclosed herein, a size of the specific graphic object may decrease as the size of the region decreases.

In an embodiment disclosed herein, the display device may further include a communication unit configured to perform communication with an external display, and a camera configured to photograph a user located in a front direction of the display device.

In an embodiment disclosed herein, the controller may perform a video call connection with the external display through the communication unit, and output an object corresponding to an external user photographed on the external display to any one of the first display and the second display.

In an embodiment disclosed herein, the controller may output to the second display the object corresponding to the external user photographed on the external display while the external user's voice is output, and output to the first display the object while the external user's voice is not output.

In an embodiment disclosed herein, the display device may further include a sensing unit to sense a user's motion, and the controller may output a part of a background image to the first display, and change the part of the background image output to the first display into another part, in response to the user's motion being sensed by the sensing unit.

In an embodiment disclosed herein, while a first part of the background image is being output to the first display, when the sensing unit senses that the user moves in a first direction, the controller may output to the first display a part that is located in a second direction opposite to the first direction based on the first part of the background image.

In an embodiment disclosed herein, the first part and the second part may at least partially overlap each other.

In an embodiment disclosed herein, the controller may determine a speed at which the first part changes to the second part to correspond to a speed at which the user moves.

According to the present disclosure, a plurality of displays can be disposed in parallel to each other such that a graphic object can be alternately output to the displays disposed at front and rear sides. This can enable an output of a three-dimensional stereoscopic image, and realize an image output method capable of optimizing a three-dimensional effect.

DETAILED DESCRIPTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Figure 6:
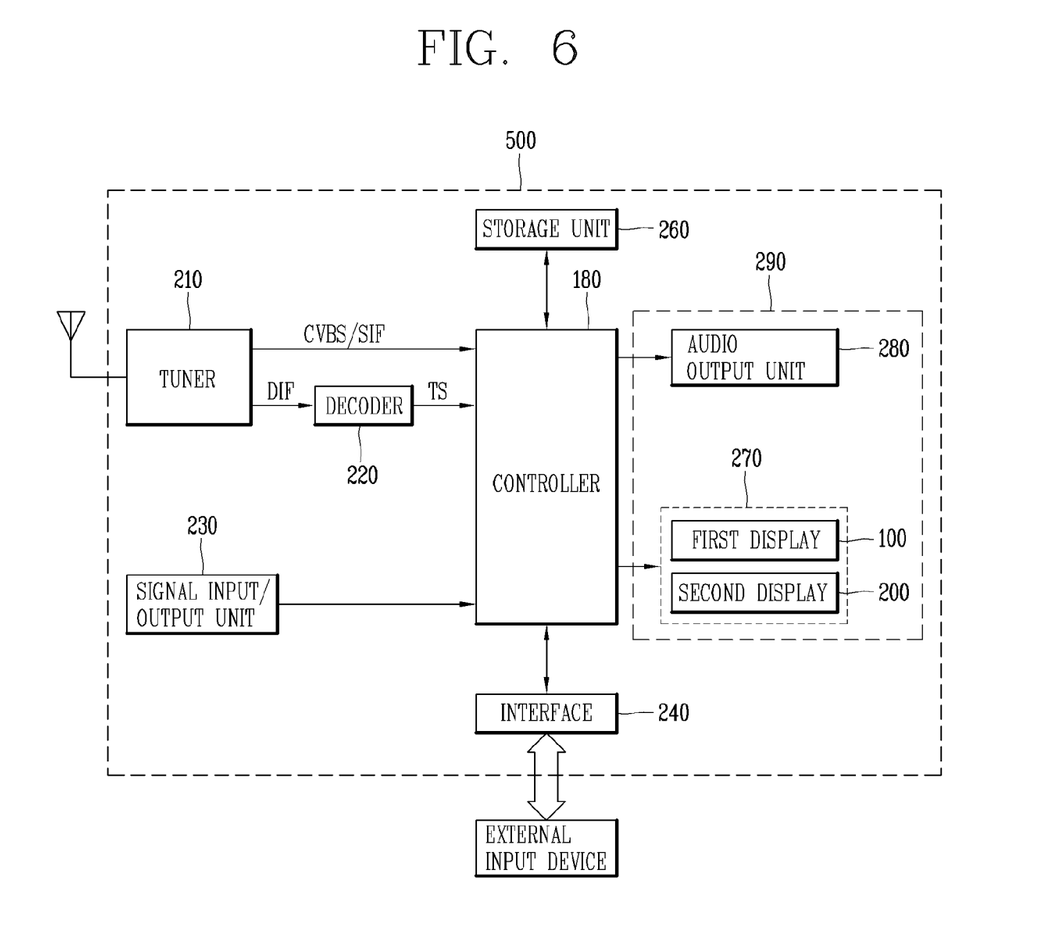
FIG. 6 is a conceptual view illustrating a display device in accordance with the present disclosure.

FIG. 6 is a conceptual view illustrating a display device in accordance with the present disclosure.

A display device 500 according to one embodiment of the present disclosure includes a tuner 210, a decoder (demodulator) 220, a signal input/output unit 230, an interface 240, a controller 180, a storage unit 260, a display unit 270, and an audio output unit 280. However, an external input device is a device separate from the display device 500, but may be included as a component of the display device 500.

Referring to FIG. 6, the tuner 210 selects a radio frequency (RF) broadcast signal, which corresponds to a channel selected by a user, from among RF broadcast signals received through an antenna, and converts the RF broadcast signal to an intermediate frequency signal or a baseband video/audio signal. For example, if the RF broadcast signal is a digital broadcast signal, the tuner 210 converts the RF broadcast signal into a digital IF signal (DIF). On the other hand, if the RF broadcast signal is an analog broadcast signal, the tuner 210 converts the RF broadcast signal into an analog baseband video/audio signal (CVBS/SIF). The tuner 210 may thus be a hybrid tuner that is capable of processing the digital broadcast signal and the analog broadcast signal.

The digital IF signal (DIF) that is output from the tuner 210 may be input to the decoder 220, while the analog baseband video/audio signal (CVBS/SIF) that is output from the tuner 210 may be input to the controller 180. The tuner 220 may receive a single carrier RF broadcast signal according to an Advanced Television Systems Committee (ATSC) format or a multi-carrier RF broadcast signal according to a Digital Video Broadcasting (DVB) format.

Although the drawing illustrates one tuner 210, the present disclosure is not limited thereto, and the display device 500 may include a plurality of tuners, for example, first and second tuners. In this case, the first tuner may receive a first RF broadcast signal corresponding to a broadcast channel selected by a user, and the second tuner may sequentially or periodically receive a second RF broadcast signal corresponding to a pre-stored broadcast channel. Similar to the first tuner, the second tuner may convert the RF broadcast signal into a digital IF signal (DIF) or an analog baseband video/audio signal (CVBS/SIF).

The decoder 220 receives the digital IF signal (DIF) converted by the tuner 210 and decodes the received signal. For example, when the digital IF signal (DIF) output from the tuner 210 is a signal according to the ATSC format, the decoder 220 performs 8-Vestigial Side Band (8-VSB) demodulation. In this case, the decoder 220 may also perform channel decoding such as trellis decoding, de-interleaving, and reed-Solomon decoding. To this end, the decoder 220 may include a trellis decoder, a de-interleaver, a reed-Solomon decoder, and the like.

As another example, when the digital IF signal (DIF) output from the tuner 210 is a signal according to the DVB standard, the decoder 220 performs a Coded Orthogonal Frequency Division Modulation (COFDMA) demodulation. In this case, the decoder 220 may perform channel decoding such as Convolution decoding, de-interleaving, Reed-Solomon decoding, and the like. To this end, the decoder 220 may include a convolution decoder, a de-interleaver, a Reed-Solomon decoder, and the like.

The signal input/output unit 230 is connected to an external device to perform signal input and output operations. To this end, the signal input/output unit 330 may include an A/V input/output unit (not illustrated) and a wireless communication unit (not illustrated).

The A/V input/output unit may include an Ethernet (Ethernet) terminal, a USB terminal, a Composite Video Banking Sync (CVBS) terminal, a component terminal, an S-video terminal (analog), a Digital Visual Interface (DVI) terminal, a High Definition Multimedia Interface (HDMI) terminal, a Mobile High-definition Link (MHL) terminal, an RGB terminal, a D-SUB terminal, an IEEE 1394 terminal, an SPDIF terminal, a Liquid HD terminal, and the like. Digital signals input through those terminals may be transmitted to the controller 180. In this case, analog signals input through the CVBS terminal and the S-video terminal may be converted into digital signals through an analog-to-digital converter (not illustrated) and transmitted to the controller 180.

The wireless communication unit may perform wireless Internet access. For example, the wireless communication unit may perform the wireless Internet access by using Wireless LAN (WLAN), Wi-Fi, Wireless broadband (Wibro), World Interoperability for Microwave Access (Wimax), High Speed Downlink Packet Access (HSDPA), and the like. In addition, the wireless communication unit may perform short-range wireless communication with other electronic devices. For example, the wireless communication unit may perform short-range wireless communication by using BLUETOOTH™, Radio Frequency IDentification (RFID), Infrared Data Association (IrDA), Ultra-WideBand (UWB), ZigBee, and the like.

The signal input/output unit 230 may transmit to the controller 180 a video signal, an audio signal, and a data signal, which are provided from external devices, such as a Digital Versatile Disk (DVD) player, a Blu-ray player, a game player, a camcorder, a computer (laptop computer), a portable device, a smart phone, and the like. In addition, the signal input/output unit 230 may transmit to the controller 180 a video signal, an audio signal, and a data signal of various media files, which are stored in an external storage device such as a memory, a hard disk, and the like. Also, the signal input/output unit 230 may output a video signal, an audio signal, and a data signal processed by the controller 180 to other external devices.

The signal input/output unit 230 may be connected to a set-top box, for example, an Internet Protocol TV (IPTV) set-top box via at least one of those various terminals to perform signal input and output operations. For example, the signal input/output unit 230 may transmit to the controller 180 a video signal, an audio signal, and a data signal, which have been processed by the IPTV set-top box to enable bi-directional communication, and also transmit signals processed by the controller 180 to the IPTV set-top box. Here, IPTV may include ADSL-TV, VDSL-TV, FTTH-TV, etc. that are classified according to transmission networks.

Digital signals output from the decoder 220 and the signal input/output unit 230 may include a stream signal TS. The stream signal TS may be a signal in which a video signal, an audio signal, and a data signal are multiplexed. For example, the stream signal TS may be an MPEG-2 Transport Stream (TS) signal obtained by multiplexing an MPEG-2 video signal, a Dolby AC-3 audio signal, etc. Here, an MPEG-2 TS signal may include a 4-byte header and a 184-byte payload.

The interface 240 may receive an input signal for power control, channel selection, screen setting, etc. from an external input device 200, or transmit a signal processed by the controller 180 to the external input device 200. The interface 240 and the external input device 200 may be connected in a wired or wireless manner.

An example of the interface 240 may be a sensor unit, and the sensor unit is configured to detect the input signal from a remote controller, for example.

A network interface (not illustrated) provides an interface for connecting the display device 500 to a wired/wireless network including an Internet network. The network interface may include an Ethernet terminal or the like for the connection with the wired network, and uses Wireless LAN (WLAN), Wi-Fi, Wireless broadband (Wibro), World Interoperability for Microwave Access (Wimax), and High Speed Downlink Packet Access (HSDPA) communication protocols for the connection with the wireless network.

The network interface (not illustrated) may access a predetermined web page through a network. That is, the network interface may access a predetermined web page to perform transmission and reception of data with a corresponding server. In addition, the network interface may receive contents or data provided by a content provider or network operator. That is, the network interface may receive contents such as movie, advertisement, game, VOD, broadcast signal, and the like, and related information from the content provider or the network provider through the network. The network interface may also receive update information and update file of a firmware provided by the network operator. The network interface may also transmit data to the Internet or to the content provider or network operator.

Also, the network interface (not illustrated) may select and receive a desired application from among applications open to the public through a network.

The controller 180 may control an overall operation of the display device 500. More specifically, the controller 180 is configured to control generation and output of a video or audio. For example, the controller 180 may control the tuner 210 to tune an RF broadcast signal corresponding to a channel selected by the user or a pre-stored channel. Although not illustrated in the drawing, the controller 180 may include a demultiplexer, a video processor, an audio processor, a data processor, an On-Screen Display (OSD) generator, and the like. Also, the controller 180 may further include a CPU, a peripheral device for hardware configuration.

The controller 180 may demultiplex a stream signal TS, for example, an MPEG-2 TS signal, into a video signal, an audio signal, and a data signal.

The controller 180 may perform video processing, e.g., demodulation (decoding) for a demultiplexed video signal. In more detail, the controller 180 may decode an MPEG-2 encoded video signal using an MPEG-2 decoder, and decode an H.264-encoded DMB or DVB-handheld (DVB-H) signal by using an H.264 decoder. Also, the controller 180 may adjust brightness, tint, and color of the video signal through video processing. The video signal processed by the controller 180 may be transmitted to the display unit 270 or may be transmitted to an external output device (not illustrated) through an external output terminal.

The controller 180 may perform audio processing, e.g., decoding for the demultiplexed audio signal. In more detail, the controller 180 may decode an MPEG-2 encoded audio signal using the MPEG-2 decoder, an MPEG-4 Bit Sliced Arithmetic Coding (BSAC)-encoded DMB audio signal using an MPEG-4 decoder, and an MPEG-2 Advanced Audio Codec (AAC)-encoded DMB or DVB-H audio signal using an AAC decoder. Also, the controller 180 may adjust base, treble and sound volume of the audio signal. The audio signal processed by the controller 180 may be transmitted to the audio output unit 280, for example, a speaker, or may be transmitted to an external output device.

The controller 180 may process an analog baseband video/audio signal (CVBS/SIF). Here, the analog baseband video/audio signal (CVBS/SIF) input to the controller 180 may be an analog baseband video/audio signal output from the tuner 210 or the signal input/output unit 230. The processed video signal is displayed on the display unit 270, and the processed audio signal is output through the audio output unit 280.

The controller 180 may perform data processing, e.g., demodulation (decoding) for a demultiplexed data signal. Here, the data signal may include Electronic Program Guide (EPG) information, which includes broadcast information, such as start time, end time and the like, related to a broadcast program broadcasted on each channel. The EPG information may include, for example, ATSC-program and system information protocol (ATSC-PSIP) information and DVB-service information (DVB-SI) information. The ATSC-PSIP information or DVB-SI information may be included in an MPEG-2 TS header (4 bytes).

The controller 180 may perform On-screen display (OSD) processing. In more detail, the controller 180 may generate an OSD signal for displaying various information as graphic or text data based on at least one of a video signal and a data signal or an input signal received from the external input device 200. The OSD signal may include various data such as a user-interface (UI) screen for the display device 500 and various menu screens, widgets, icons and the like.

The storage unit 260 may store various programs for signal processing and control by the controller 180, and may also store processed video, audio and data signals. The storage unit 260 may include at least one storage medium of a flash memory, a hard disc, a multimedia card micro-type storage medium, a card-type memory (for example, SD or XD memory), a random access memory (RAM), a static random access memory (SRAM), a read-only memory (ROM), electrically erasable programmable ROM (EEPROM), a programmable read-only memory (PROM), a magnetic memory, a magnetic disk and an optical disk.

The display unit 270 may convert a video signal, data signal, and OSD signal processed by the controller 180 into RGB signals, thereby generating driving signals. The display unit 270 may output a video by those signals. The display unit 270 may be implemented into various types of displays such as a plasma display panel, a liquid crystal display (LCD), a thin film transistor-LCD (TFT-LCD), an organic light-emitting diode (OLED), a flexible display, a three-dimensional (3D) display, an e-ink display and the like. The display 370 may also be implemented as a touch screen and may thus be used as an input device.

The display unit 270 may include a first display 100, and a second display 200 disposed at the front of the first display 100 with a predetermined distance therebetween and arranged in parallel to the first display 100.

For example, the first display 100 may be implemented into various displays such as PDP, LCD, TFT-LCD, OLED, flexible display, etc. described above, and the second display 200 may be a transparent display.

In addition, the display unit 270 may further include a case 300 disposed to surround edges of the first display 100 and the second display 200.

A description related to this will be given later in more detail with reference to FIGS. 1 and 2.

The audio output unit 280 outputs an audio signal processed by the controller 180, for example, a stereo signal or a 5.1-channel signal. The audio output unit 280 may be implemented in various types of speakers.

Meanwhile, a photographing unit (not illustrated) for photographing a user may be further provided. The photographing unit (not illustrated) may be implemented with a single camera, but is not limited thereto, and may be implemented with a plurality of cameras. Video (image) information photographed by the photographing unit (not illustrated) is input to the controller 180.

The display device 500 may further include a sensing unit (not illustrated) that is provided with at least one of a touch sensor, an audio sensor, a location sensor, an operation sensor, and a camera 502, in order to detect a user's gesture, as described above. A signal sensed by the sensing unit (not illustrated) may be transmitted to the controller 180 through the interface 240.

The controller 180 may detect a user's gesture by using a video obtained from the camera 502 or a signal sensed by the sensing unit (not illustrated) individually or in combination.

A power supply unit (not illustrated) supplies corresponding power to all components of the display device 500. In particular, the power supply unit may supply power to the controller 180 that can be implemented in the form of a system on chip (SOC), the display unit 270 for displaying a video, and the audio output unit 280 for outputting an audio signal.

To this end, the power supply unit (not illustrated) may include a converter (not illustrated) for converting AC power into DC power. Meanwhile, for example, the power supply unit may further include an inverter (not illustrated) that can perform a PWM operation for varying luminance or executing a dimming function when the display unit 270 is implemented as a liquid crystal panel having a plurality of backlight lamps.

An external input device is connected to the interface 240 in a wired or wireless manner, and transmits an input signal generated according to a user input to the interface 240. The external input device may include a remote controller, a mouse, a keyboard, and the like. The remote controller may transmit an input signal to the interface 240 through Bluetooth, RF communication, infrared communication, UWB, ZigBee, or the like. The remote controller may be implemented as a spatial remote control device. The spatial remote control device may generate an input signal by sensing a motion of a main body in a space. The external input device may include a mobile terminal according to an embodiment of the present disclosure.

The display device 500 may be implemented as a fixed digital broadcasting receiver that is capable of receiving at least one of digital broadcasting of ATSC (8-VSB), digital broadcasting of DVB-T (COFDM), digital broadcasting of ISDB-T (BST-OFDM), and the like. In addition, the display device 500 may be implemented as a mobile digital broadcasting receiver that is capable of receiving at least one of digital broadcasting of terrestrial DMB, digital broadcasting of satellite DMB, digital broadcasting of ATSC-M/H, digital broadcasting of DVB-H (COFDM), and digital broadcasting of a Media Forward Link Only (MediaFLO) format. Also, the display device 500 may be implemented as a digital broadcasting receiver for cable, satellite communication, and IPTV.

Hereinafter, a display device of the present disclosure for effectively realizing a three-dimensional effect will be described in more detail with reference to the accompanying drawings.

It will be apparent to those skilled in the art that the present disclosure may be embodied in other specific forms without departing from the spirit or essential characteristics thereof.

Figure 1:
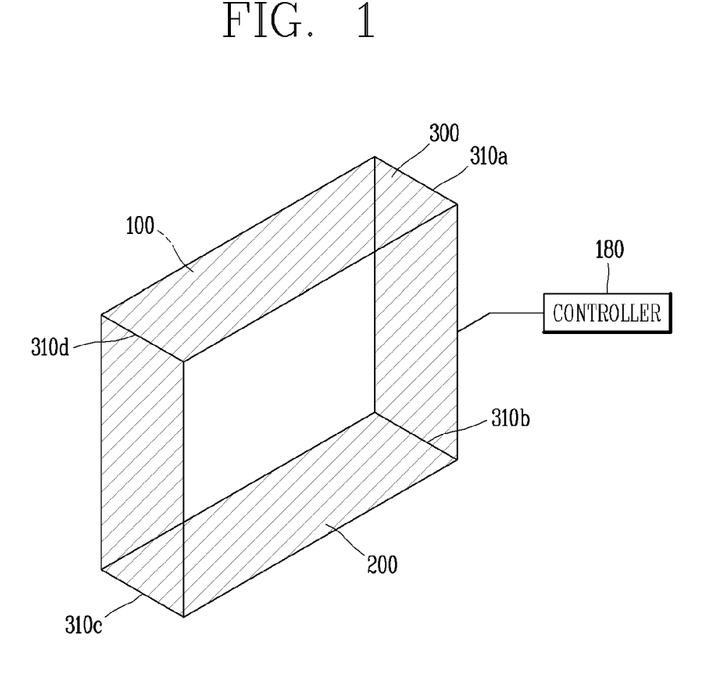
FIGS. 1 and 2 are conceptual views illustrating a display device in accordance with one embodiment of the present disclosure.
Figure 2:
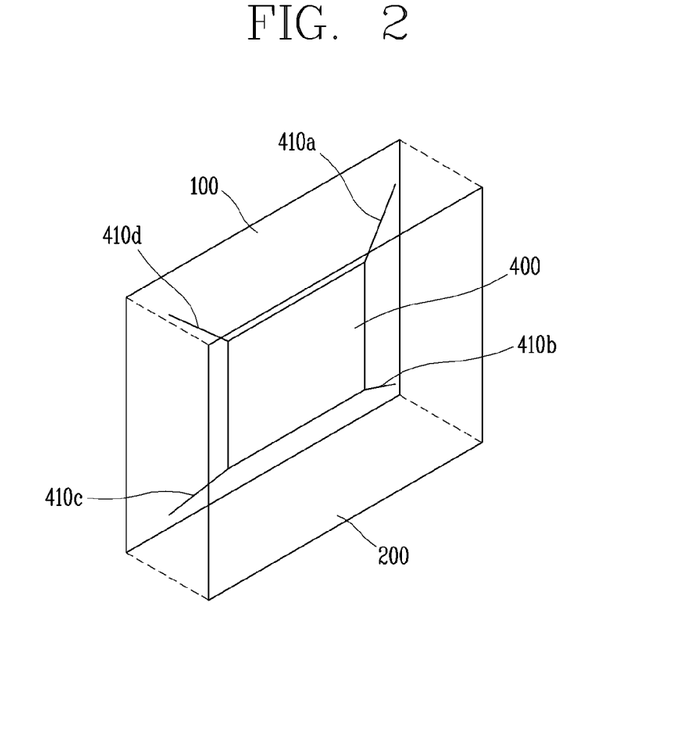

FIGS. 1 and 2 are conceptual views illustrating a display device in accordance with one embodiment of the present disclosure.

First, referring to FIG. 1, a display device according to one embodiment may include a first display 100, a second display 200 disposed at the front of the first display 100 with a predetermined distance therebetween and arranged in parallel to the first display 100, and a controller 180 configured to control the first display 100 and the second display 200 to output a specific graphic object in an alternating manner for outputting a three-dimensional image.

Specifically, when outputting the specific graphic object to the first display 100, the controller 180 may control the second display 200 not to output the graphic object. On the other hand, when outputting the specific graphic object to the second display 200, the controller 180 may control the first display 100 not to output the specific graphic object.

The specific graphic object may include all kinds of images, videos, texts, graphic objects generated through predetermined processing, three-dimensional images, etc. For example, in a video (telephony) call with a conversation partner using another display device, the specific graphic object may include an object that represents the conversation partner's image (or a dynamic object that only the conversation partner's image is cropped).

As illustrated in FIG. 1, the first display 100 and the second display 200 may have the same output size.

In this case, the controller 180 may output the specific graphic object in a different size or the same size when outputting it to the first display 100 and when outputting it to the second display 200.

For example, the controller 180 may output the specific graphic object in the same size when outputting the specific graphic object to the first display 100 and when outputting the specific graphic object to the second display 200.

Even if the specific graphic object is output in the same size, since the first display 100 is disposed more rearward (farther) than the second display 200 from the user, the user can feel that the specific graphic object output to the first display 100 is smaller. Therefore, a three-dimensional effect can be provided to the user.

As another example, the controller 180 may output the specific graphic object in a first size when outputting the specific graphic object to the first display 100, while outputting the specific graphic object in a second size larger than the first size when outputting the specific graphic object to the second display 200.

With this configuration, in the present disclosure, the specific graphic object output on the first display 100 can be felt smaller in perspective, and the output size can also be smaller than that on the second display 200, a more dramatic three-dimensional effect can be provided.

In order to output a three-dimensional image, the controller 180 may output a specific graphic object at an appropriate (corresponding) position based on a direction perpendicularly penetrating through the first display 100 and the second display 200.

That is, when outputting the specific graphic object alternately to the first display 100 and the second display 200, the controller 180 may output the specific graphic object at a corresponding position based on a direction perpendicularly penetrating through the first display 100 and the second display 200.

Meanwhile, as illustrated in FIG. 1, in order to produce a three-dimensional effect more effectively, the display device 500 of the present disclosure may further include a case 300 that surrounds edges of the first display 100 and the second display 200.

The case 300 may be formed in a shape surrounding the edges of the first display 100 and the second display 200 to create an inner space between the first display 100 and the second display 200.

In addition, the case 300 may be formed in a dark color (e.g., black) to realize spatial impression.

Lightings 310a, 310b, 310c, and 310d may be disposed at corners of the case 300.

The lightings 310a, 310b, 310c, and 310d may serve to realize spatial perception, a three-dimensional effect, or depth perception.

To this end, the lightings 310a, 310b, 310c, and 310d may output light with darker brightness toward the first display 100 from the second display 200. That is, the lightings may produce a gradation effect such that it becomes darker as it goes from the second display 200 toward the first display 100.

The lightings may be controlled by the control of the controller 180, and may include a plurality of light emitting elements to produce the gradation effect.

Accordingly, the plurality of light emitting elements included in the lightings may be controlled to output brighter light as they are adjacent to the second display 200, and may be controlled to output darker light as they are adjacent to the first display 100.

Without being limited to this, the lightings 310a, 310b, 310c, and 310d may be controlled by the controller 180 to output light of the same brightness in order to generate spatial impression.

Also, as described above, the second display 200 may be a transparent display.

Meanwhile, the controller 180 may control the first display 100 in addition to the case, to output a three-dimensional image.

Referring to FIG. 2, the controller 180 may set a region 400 having a size, which is smaller than an output screen of the second display 200, in the first display 100 and output the specific graphic object within the region 400.

The region 400 may be set based on a center of the first display 100, to be smaller than an output region of the first display 100.

The controller 180 may display a guide image, which assists the user to identify the region 400, on the first display 100.

For example, when the region 400 is formed in a rectangular shape, the guide image may be provided for the user to identify edges of the region 400.

The guide image may include a figure formed to identify the region 400, and a plurality of lines 410a, 410b, 410c, and 410d drawn toward vertices of the first display 100.

The plurality of lines may be straight lines drawn from vertices of the figure formed to identify the region 400 toward the vertices of the first display 100.

The guide image may be an image that can generate a three-dimensional effect when the user views the display device 500 from the front.

In addition, the region 400 does not use the entire output region of the first display 100, but may be formed in a size smaller than that of the second display 200. Accordingly, the user can feel that the specific graphic object output to the first display 100 is located farther away.

That is, the controller 180 may control the size of the specific graphic object to decrease as the size of the region decreases.

As the size of the region 400 set in the first display 100 becomes smaller, the user can feel greater depth (i.e., as the size of the region 400 decreases, it can be felt that the first display is located farther away).

In this case, when the specific graphic object is output to the first display 100, it is output in the region 400.

Although it is illustrated in FIG. 2 that there is no case, as described in FIG. 2, it should be understood that an instance in which the case 300 is provided while controlling the first display 100 is also included in the scope of the present disclosure.

Figure 3:
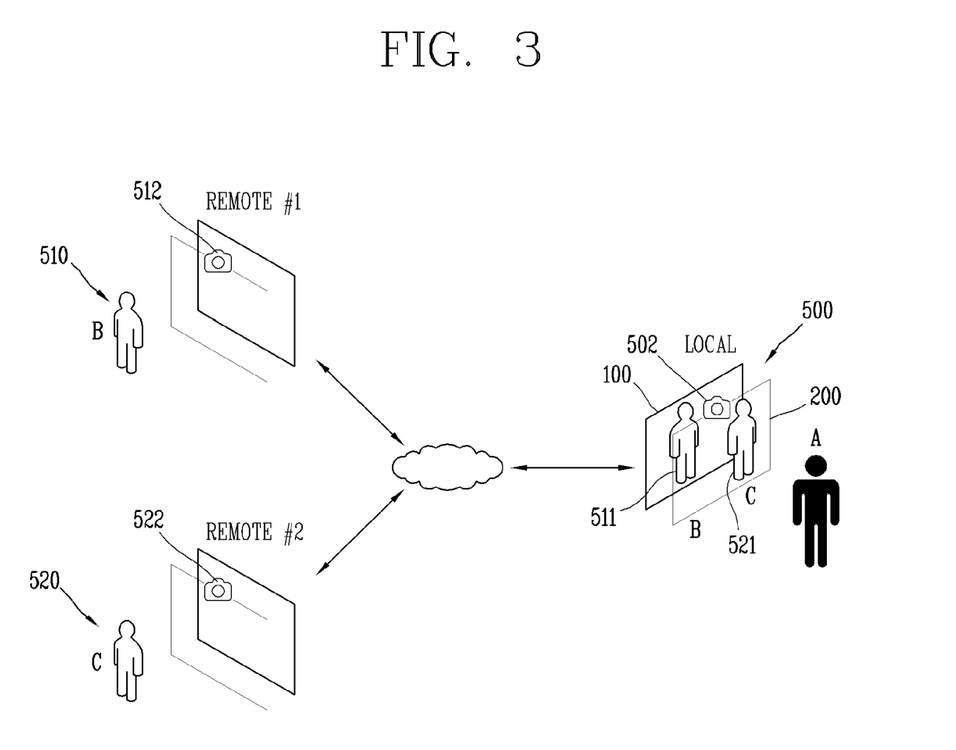
FIGS. 3 and 4 are conceptual views for explaining a method of providing a three-dimensional effect by using a display device when performing a telephony call using a plurality of display devices.
Figure 4:
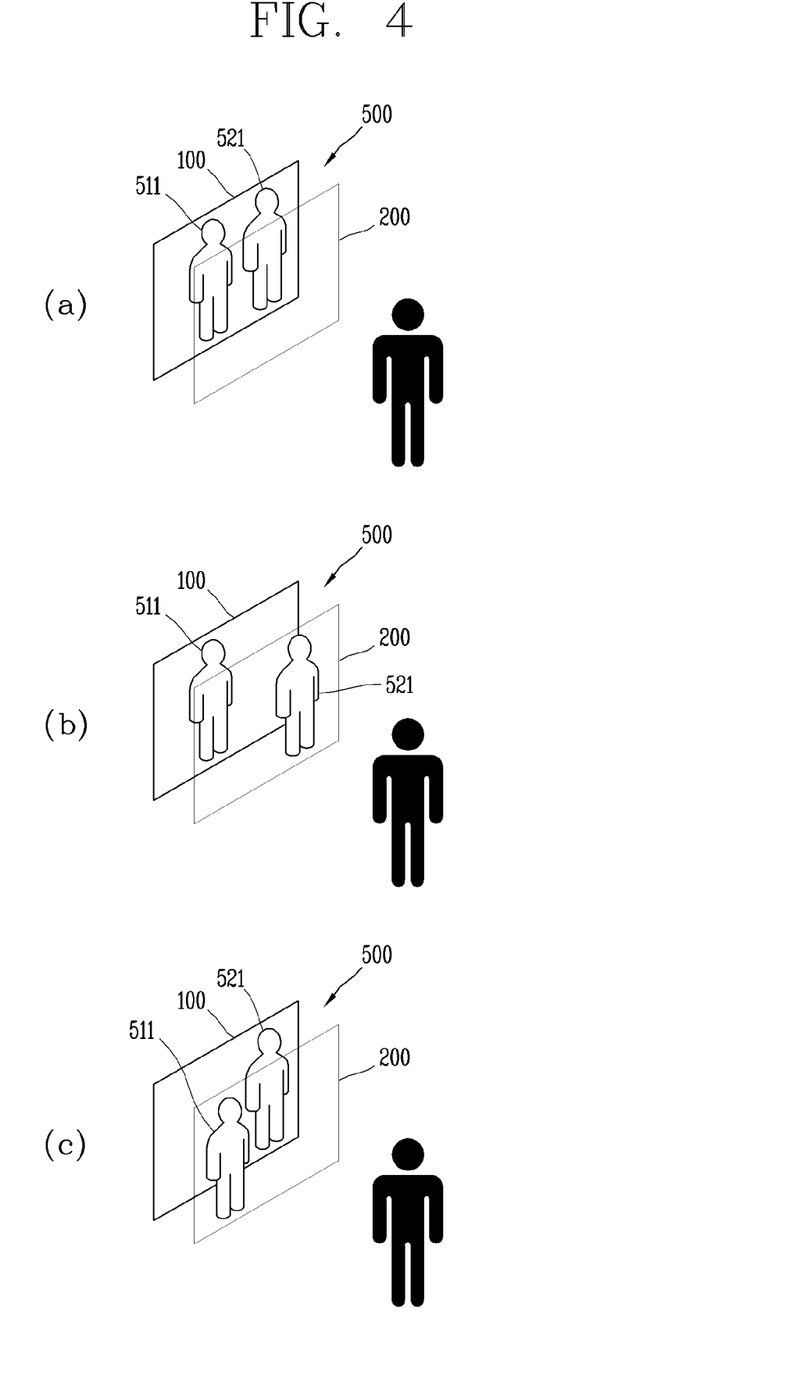

FIGS. 3 and 4 are conceptual views for explaining a method of providing a three-dimensional effect by using a display device when performing a video (telephony) call through a plurality of display devices.

The display device 500 of the present disclosure may further include a communication unit configured to communicate with an external display and a camera 502 configured to photograph a user who is located at the front of the display device.

The display device 500 may perform a video call (or a telephony call, a video conference, etc.) with an external display using the communication unit and the camera 502 (and the audio input/output unit 280).

As illustrated in FIG. 3, the display device 500 may perform a video call connection through communication with external displays used by external users B and C.

As illustrated in (a) of FIG. 4, the controller 180 may perform a video call connection with an external display through the communication unit, and output an object 511, 521 that corresponds to an external user 510, 520 photographed on the external display to any one of the first display 100 and the second display 200.

The controller 180 may receive an image photographed by a camera 512, 522 of the external display (or an object corresponding to the photographed external user in the image) through the communication unit. Also, the controller 180 may receive an audio signal from the external display through the communication unit, and determine whether the external user is speaking by using the received audio signal.

As illustrated in (b) and (c) of FIG. 4, the controller 180 may output an object corresponding to an external user, who has been photographed on the external display, on the second display while the external user's voice is output, and on the first display while the external user's voice is not output.

For example, when the external user C is speaking (or when an audio signal is received from the external display of the external user C), the controller 180, as illustrated in (b) of FIG. 4, may output an object 521 corresponding to the external user C to the second display 200.

In addition, as illustrated in (b) of FIG. 4, when the external user B is not speaking, the controller 180 may output an object 511 corresponding to the external user B to the first display 100.

As illustrated in (a) of FIG. 4, in a state in which both of the external users B and C are not speaking (when audio signals are not received from both of the external display of the external user B and the external display of the external user C), the controller 180 may output both of the objects 511 and 521 corresponding to the external users B and C to the first display 100.

In addition, as illustrated in (c) of FIG. 4, when the external user B is talking and the external user C is not talking (that is, when an audio signal is received from the external display of the external user B and an audio signal is not received from the external display of the external user C), the controller 180 may output to the second display 200 the object 511 of the external user B photographed on the external display from which the audio signal has been received, and output to the first display 100 the object 521 of the external user C photographed on the external display from which the audio signal has not been received.

With this configuration, the present disclosure can provide a three-dimensional effect by outputting an external user who is speaking to the front display and another user who is not speaking to the rear display during a video call.

Figure 5:
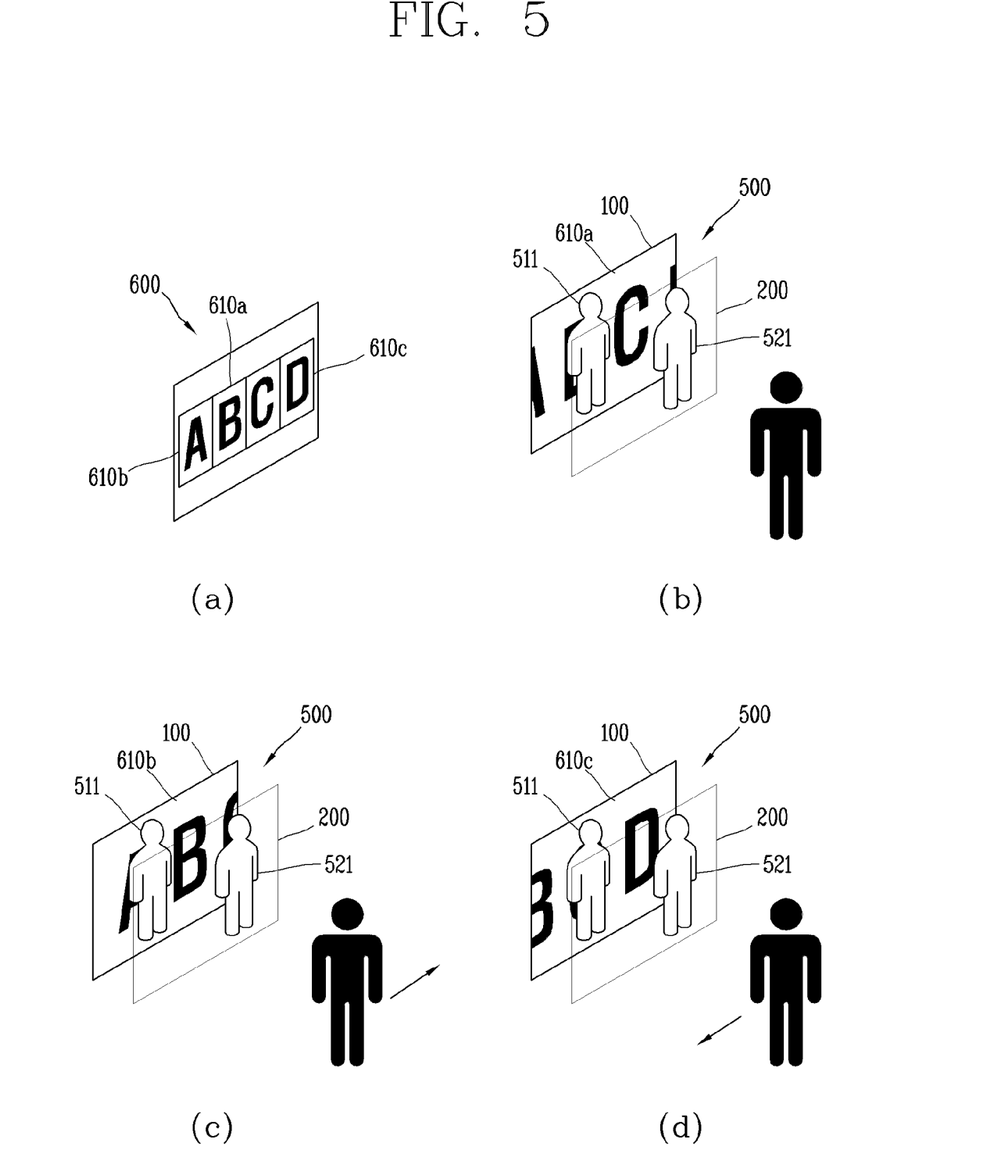
FIG. 5 is a conceptual view for explaining a method for improving a three-dimensional effect by adjusting (manipulating) a background according to a user's motion.

FIG. 5 is a conceptual view for explaining a method for improving a three-dimensional effect by adjusting (manipulating) a background according to a user's motion.

Referring to FIG. 5, the display device of the present disclosure may dynamically output a background image to improve a three-dimensional effect.

Referring to (a) and (b) of FIG. 5, the controller 180 may output a part 610a of a background image 600 to the first display.

The display device may further include a sensing unit to sense a user's motion.

The sensing unit may be the camera 502, and may include a proximity sensor, a motion sensor, an RGB sensor, an infrared (IR) sensor, an ultrasonic sensor, an optical sensor (e.g., camera), and the like.

The controller 180 may change the part 610a of the background image, which has been output on the first display 100, to another part 610b, in response to the user's motion sensed by the sensing unit.

Specifically, while the first part 610a of the background image is being output on the first display 100, when the sensing unit senses that the user moves in a first direction, the controller 180 may output a second part, which is located in a second direction opposite to the first direction based on the first part of the background image, on the first display 100.

For example, as illustrated in (c) of FIG. 5, when it is sensed that the user moves to the right, the controller 180 may output on the first display 100 the second part 610b (A, B), which is located on the left opposite to the right based on the first part 610a (B, C) of the background image 600.

As another example, as illustrated in (d) of FIG. 5, when it is sensed that the user moves to the left, the controller 180 may output on the first display 100 a third part 610c (C, D), which is located on the right opposite to the left based on the first part 610a (B, C) of the background image 600.

The first part 610a and the second part 610b may at least partially overlap each other (for example, a portion of the letter B), and a display region may change in a sliding manner when the first part changes to the second part.

Similarly, the first part 610a and the third part 610c may at least partially overlap each other (for example, a portion of the letter C), and a display region may change in a sliding manner when the first part changes to the third part.

Also, the controller 180 may determine a moving speed of the user through the sensing unit.

The controller 180 may determine a speed at which the first part changes to the second part to correspond to the moving speed of the user sensed by the sensing unit.

According to the present disclosure, a plurality of displays can be disposed in parallel to each other such that a graphic object can be alternately output to the displays disposed at front and rear sides. This can enable an output of a three-dimensional stereoscopic image, and realize an image output method capable of optimizing a three-dimensional effect.

The present disclosure can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, Therefore, all changes and modifications that fall within the metes and bounds of the claims, or equivalents of such metes and bounds are therefore intended to be embraced by the appended claims.

What is claimed is:

1. A display device comprising:
   a first display;
   a second display positioned in front of the first display, wherein the second display is transparent;
   a communication unit configured to perform communication for conducting a video call with at least two external devices; and
   a processor configured to:
      cause the first display or the second display to display an image of a first participant corresponding to a first external device of the at least two external devices based on connection of the video call with the first external device;
      cause the first display or the second display to display an image of a second participant corresponding to a second external device of the at least two external devices based on connection of the video call with the second external device; and
      cause the second display to display the image of the first participant in response to detecting that the first participant is speaking based on audio data received from the first external device or to display the image of the second participant in response to detecting that the second participant is speaking based on audio data received from the second external device,
   wherein an image of a participant displayed on the second display is displayed in a larger size than an image of the same participant displayed on the first display to enhance a sense of depth of the display device.

2. The display device of claim 1, further comprising a case extending between respective edges of the first display and the second display, wherein the case is configured to define an inner space between the first display and the second display.

3. The display device of claim 2, further comprising a plurality of light sources disposed at an interior of the case and configured to emit light toward the inner space, such that light emitted toward the second display is brighter than light emitted toward the first display.

4. The display device of claim 3, wherein the plurality of light sources are further configured to emit the light to have a brightness gradation which decreases from the second display toward the first display.

5. The display device of claim 1, wherein, based on the first display displaying the first participant or the second participant, the processor is further configured to cause the first display to display a guide image surrounding the displayed first participant or the second participant.

6. The display device of claim 5, wherein the displayed guide image comprises a plurality of perspective lines to further enhance the sense of depth of the display device.

7. The display device of claim 1, further comprising a camera configured to capture images of a user of the display device during the video call.

8. The display device of claim 1, wherein the processor is further configured to cause the first display to display a background image displayed to appear behind the displayed first participant or the second participant.

9. The display device of claim 8, further comprising a sensor configured to detect movement of a user located in front of the display device, wherein the processor is further configured to:
   change the displayed background image corresponding to side-to-side movement of the user detected via the sensor such that the background image appears to be moved with respect to the displayed first participant or the second participant.

10. A display device comprising:
    a first display;
    a second display positioned in front of the first display, wherein the second display is transparent;
    a communication unit configured to perform communication for conducting a video call; and
    a processor configured to:
       cause the first display to display an image of a first participant corresponding to a first external device based on connection of the video call with the first external device; and
       cause the second display to display the image of the first participant in response to detecting that the first participant is speaking based on audio data received from the first external device,
    wherein an image of the first participant displayed on the second display is displayed in a larger size than an image of the first participant displayed on the first display to enhance a sense of depth of the display device.

11. The display device of claim 10, wherein:
    the video call further includes a second external device; and
    the processor is further configured to cause the first display to display an image of a second participant corresponding to the second external device while the first participant is displayed on the second display in response to detecting that the first participant is speaking.

12. The display device of claim 11, wherein the processor is further configured to cause the first display to display a guide image surrounding the displayed second participant.

13. The display device of claim 12, wherein the displayed guide image comprises a plurality of perspective lines to further enhance the sense of depth of the display device.

14. The display device of claim 11, wherein the processor is further configured to cause the first display to display a background image displayed to appear behind the displayed second participant.

15. The display device of claim 14, further comprising a sensor configured to detect movement of a user located in front of the display device, wherein the processor is further configured to:
    change the displayed background image corresponding to side-to-side movement of the user detected via the sensor such that the background image appears to be moved with respect to the displayed second participant.

16. The display device of claim 10, further comprising a case extending between respective edges of the first display and the second display, wherein the case is configured to define an inner space between the first display and the second display.

17. The display device of claim 16, further comprising a plurality of light sources disposed at an interior of the case and configured to emit light toward the inner space, such that light emitted toward the second display is brighter than light emitted toward the first display.

18. The display device of claim 17, wherein the plurality of light sources are further configured to emit the light to have a brightness gradation which decreases from the second display toward the first display.

19. The display device of claim 10, further comprising a camera configured to capture images of a user of the display device during the video call.

20. A display device comprising:
a first display;
a second display positioned in front of the first display, wherein the second display is transparent;
a communication unit configured to perform communication for conducting a video call with at least two external devices; and
a processor configured to:
cause the first display or the second display to display an image of a first participant corresponding to a first external device of the at least two external devices based on connection of the video call with the first external device;
cause the first display or the second display to display an image of a second participant corresponding to a second external device of the at least two external devices based on connection of the video call with the second external device;
cause the second display to display the image of the first participant and causing the first display to display the image of the second participant in response to detecting that the first participant is speaking based on audio data received from the first external device; and
cause the second display to display the image of the second participant and causing the first display to display the image of the first participant in response to detecting that the second participant is speaking based on audio data received from the second external device,
wherein an image of a participant displayed on the second display is displayed in a larger size than an image of the same participant displayed on the first display to enhance a sense of depth of the display device.

* * * * *